United States Patent
Boldt et al.

(10) Patent No.: US 10,678,488 B2
(45) Date of Patent: Jun. 9, 2020

(54) DYNAMIC SPLITTING OF PORTABLE DOCUMENT FORMAT PRINT JOBS

(71) Applicants: Gerald Donald Boldt, Longmont, CO (US); Michael Glen Lotz, Longmont, CO (US); Jeffrey Alan Sikkink, Longmont, CO (US); Joseph Wayne Stradling, Firestone, CO (US); Marquis G. Waller, Beverly, OH (US)

(72) Inventors: Gerald Donald Boldt, Longmont, CO (US); Michael Glen Lotz, Longmont, CO (US); Jeffrey Alan Sikkink, Longmont, CO (US); Joseph Wayne Stradling, Firestone, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 800 days.

(21) Appl. No.: 15/001,665

(22) Filed: Jan. 20, 2016

(65) Prior Publication Data

US 2017/0206043 A1   Jul. 20, 2017

(51) Int. Cl.
*G06F 3/12* (2006.01)

(52) U.S. Cl.
CPC .......... *G06F 3/1241* (2013.01); *G06F 3/1211* (2013.01); *G06F 3/1285* (2013.01)

(58) Field of Classification Search
CPC .... G06F 3/1241; G06F 3/1211; G06F 3/1248; G06F 3/1285
See application file for complete search history.

(56) References Cited

U.S. PATENT DOCUMENTS

| | | |
|---|---|---|
| 7,880,913 B2 | 2/2011 | Ford et al. |
| 7,995,225 B2 | 8/2011 | Lofthus et al. |
| 8,125,684 B2 | 2/2012 | Triplett et al. |
| 8,127,012 B2 | 2/2012 | Rai |
| 8,384,927 B2 | 2/2013 | Harmon et al. |
| 8,725,546 B2 | 5/2014 | Rai |

(Continued)

FOREIGN PATENT DOCUMENTS

| | | |
|---|---|---|
| JP | 2008305267 A * | 12/2008 |
| JP | 2011113178 | 6/2011 |

OTHER PUBLICATIONS

U.S. Appl. No. 14/557,276.

*Primary Examiner* — Fan Zhang
(74) *Attorney, Agent, or Firm* — Duft & Bornsen, PC (57) ABSTRACT

Systems and methods are provided for dynamically splitting print jobs to reduce the time taken to start printing those jobs, allowing those jobs to be printed on a wider range of printers more efficiently. One embodiment includes a print server with an interface that is able to receive a Portable Document Format (PDF) print job. The print server also includes a job controller that divides the PDF print job into segments. Dividing the PDF print job includes determining a segment size comprising a number of the logical pages to include in each segment, based on the memory footprint for the logical pages. Dividing the PDF print job also includes generating multiple segments, populating each of the segments with logical pages from the PDF print job based on the segment size, and populating each of the segments with a page tree. The job controller transmits the segments to a printer.

18 Claims, 7 Drawing Sheets (56) References Cited

U.S. PATENT DOCUMENTS

| | | | | |
|---|---|---|---|---|
| 2003/0208607 A1* | 11/2003 | Yamazaki | ............ | G06F 3/1204 |
| | | | | 709/229 |
| 2004/0234169 A1* | 11/2004 | Tojo | ................. | G06K 9/00463 |
| | | | | 382/305 |
| 2004/0236924 A1* | 11/2004 | Johnson | ................. | G06F 12/08 |
| | | | | 711/173 |
| 2012/0050796 A1* | 3/2012 | Yokokura | ............... | G06F 3/121 |
| | | | | 358/1.15 |
| 2013/0132647 A1* | 5/2013 | Melik-Martirosian | ...................... | |
| | | | | G06F 12/0246 |
| | | | | 711/103 |
| 2015/0057784 A1 | 2/2015 | Butler et al. | | |

* cited by examiner

| # | CATEGORY | PROPERTIES | PRINTER RANKINGS | HISTORY –PRTR1 | HISTORY –PRTR2 | HISTORY –PRTR3 |
|---|---|---|---|---|---|---|
| 1 | TEXT | NO IMGS | PRTR 1, PRTR 2, PRTR 3 | NO ISSUES | 3 SLOWDOWNS | 5 SLOWDOWNS |
| 2 | STANDARD | <2 IMGS/PAGE | PRTR 1, PRTR 3, PRTR 2 | NO ISSUES | 1 SLOWDOWN | NO ISSUES |
| 3 | IMAGE | 2+ IMGS/PAGE | PRTR 1, PRTR 3, PRTR 2 | 1 SLOWDOWN | 2 HALTS | 1 HALT |
| 4 | BOOK | BINDING REQ'D | PRTR 2 | INCOMPATIBLE | 1 SLOWDOWN | INCOMPATIBLE |

510

| PRINTER | DEVICE CAPABILITIES | SEG. SIZE 1 | SEG. SIZE 2 | SEG. SIZE 3 | SEG. SIZE 4 |
|---|---|---|---|---|---|
| 1 | 24 PPM, COLOR | 90 | 40 | 15 | N/A |
| 2 | 16 PPM, COLOR, BIND | 50 | 40 | 10 | 20 |
| 3 | 32 PPM | 45 | 40 | 12 | N/A |

520

MEMORY
126

DYNAMIC SPLITTING OF PORTABLE DOCUMENT FORMAT PRINT JOBS

FIELD OF THE INVENTION

The invention relates to the field of printing, and in particular, to Portable Document Format (PDF) print jobs.

BACKGROUND

Entities with substantial printing demands typically use a production printer. A production printer is a high-speed printer used for volume printing (e.g., one hundred pages per minute or more). Production printers include continuous-forms printers that print on a web of print media stored on a large roll.

A production printer typically includes a localized print controller that controls the overall operation of the printer, and a print engine (sometimes referred to as an "imaging engine" or a "marking engine"). The print engine includes one or more printhead assemblies, with each assembly including a printhead controller and a printhead (or array of printheads). An individual printhead includes multiple (e.g., hundreds of) tiny nozzles that discharge ink as controlled by the printhead controller.

Production printers typically have limited memory capacities for storing print data. This may cause a problem when a printer receives a print job in the PDF format, because a printer cannot initiate printing for a PDF print job until the entire PDF file has been stored in memory at the printer. If the PDF document is too large for the memory of the printer (e.g., 120,000 pages), the memory of the printer overflows before the entire job is loaded, meaning that printing for the job fails.

SUMMARY

Embodiments described herein dynamically split PDF print jobs into independent PDF segments for processing by a printer. The PDF segments for a job are sized based on an average memory footprint of logical pages for the print job. In this manner, image heavy PDF print jobs may be split into segments having a different number of pages than textual PDF print jobs. This technique prevents the problematic memory overflow problems discussed above. This technique also ensures that segments are dynamically sized for their assigned printers.

One embodiment is a system comprising a print server. The print server includes an interface that is able to receive a Portable Document Format (PDF) print job. The print server also includes a job controller that divides the PDF print job into segments. Dividing the PDF print job includes determining a segment size comprising a number of the logical pages to include in each segment, based on an average memory footprint for the logical pages. Dividing the PDF print job also includes generating multiple segments, populating each of the segments with logical pages from the PDF print job based on the segment size, and populating each of the segments with a PDF page tree. The job controller transmits the segments to an assigned printer for processing.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
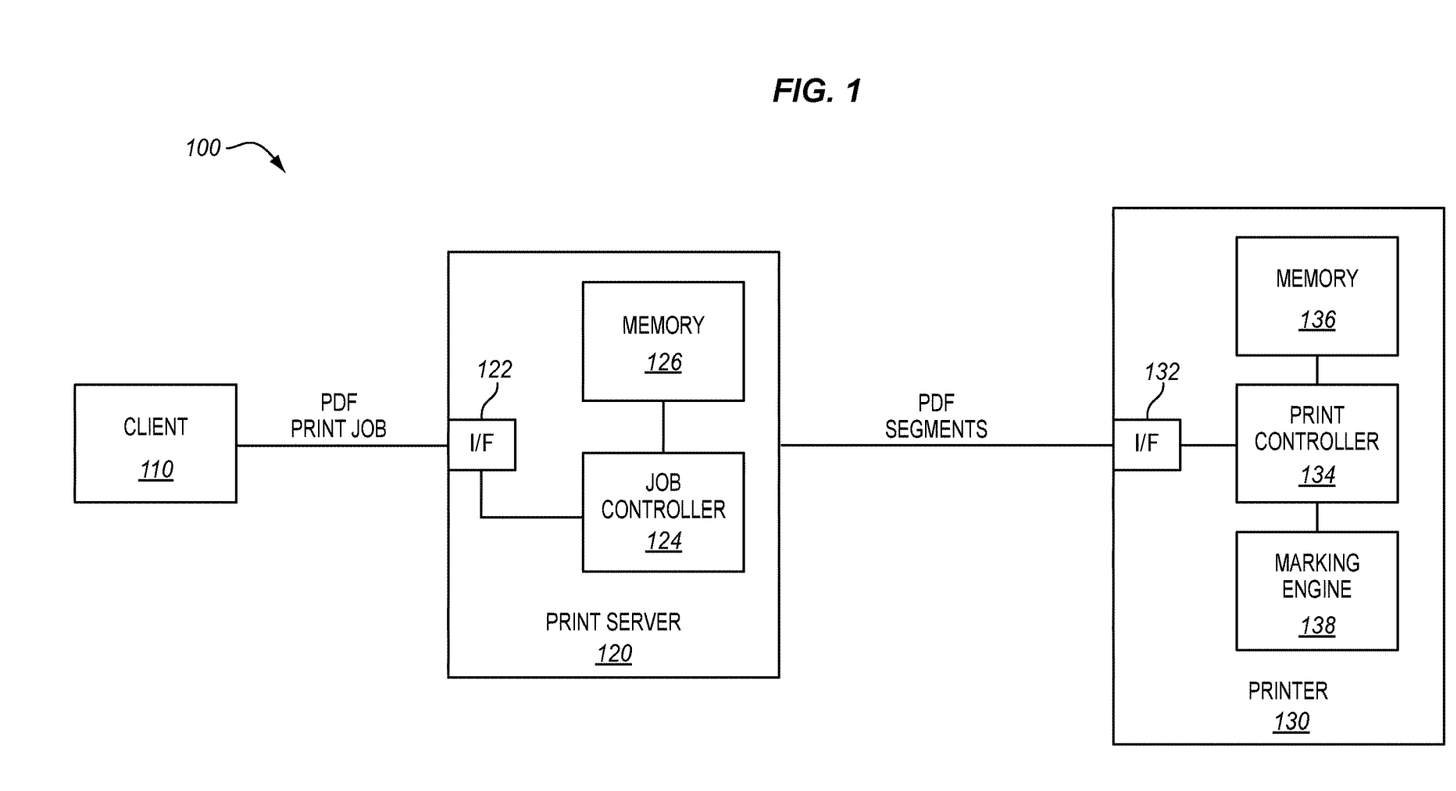
FIG. 1 is a block diagram of a printing system in an exemplary embodiment.

FIG. 1 is a block diagram of a printing system 100 in an exemplary embodiment. In printing system 100, incoming PDF print jobs from client 110 are received at print server 120 and assigned to a printer (e.g., printer 130) for printing. Print server 120 has been enhanced to dynamically split a print job into independent segments for transmission to an assigned printer. Specifically, print server 120 selects a number of logical pages for a segment based on the average logical page size (i.e., space in memory of a logical page) for the print job. This enables print server 120 to adaptively adjust the size of PDF segments on a job-by-job basis in order to ensure that the printer continues to operate in an efficient manner without processing delays.

While print server 120 is shown as coupled with only one printer, print server 120 may manage the operations of multiple printers in a print shop environment. In this embodiment, print server 120 includes an interface (I/F) 122 (e.g., an Ethernet interface, wireless interface, etc.) for receiving print jobs from client 110. Print server 120 further includes a job controller 124 for handling print jobs received at print server 120, and a memory 126 (e.g., Random Access Memory (RAM), a hard disk, etc.) for storing print jobs. Controller 124 transmits PDF files to printer 130 for printing, and may be implemented as custom circuitry, as a processor executing programmed instructions, etc.

Printer 130 receives PDF files from print server 120 via interface 132, stores the PDF files in memory 136 (e.g., RAM or a hard disk), and marks physical media based upon the received PDF files. Printer 130 includes print controller 134. Print controller 134 manages the overall operations of printer 130, and may direct one or more Raster Image Processors (RIPs) to rasterize received print data. Rasterized data is sent to marking engine 138, which physically applies a colorant (e.g., toner, ink, etc.) onto print media to generate/mark a physical version of the print job. Printer 130 may utilize a continuous-forms marking engine, a cut-sheet marking engine, etc. In some embodiments, in order to initiate printing/marking for a PDF file, printer 130 must access page tree information for that PDF file. However, the location of page tree information is indicated in a PDF trailer at the end of a PDF file. This is why printer 130 waits to receive an entire, complete PDF file before it attempts to initiate printing. By segmenting incoming print jobs into independent segments that each have their own page tree, print server 120 reduces the amount of delay that would normally be encountered before printing initiates.

The particular arrangement, number, and configuration of components described herein is exemplary and non-limiting. Illustrative details of the operation of printing system 100 will be discussed with regard to FIG. 2, which illustrates a decision making process performed at print server 120 in order to dynamically split incoming PDF print jobs. Assume, for this embodiment, that one or more clients 110 are being operated by users to submit PDF print jobs to print server 120. The incoming PDF print jobs are intended for printing at printers managed by print server 120.

Figure 2:
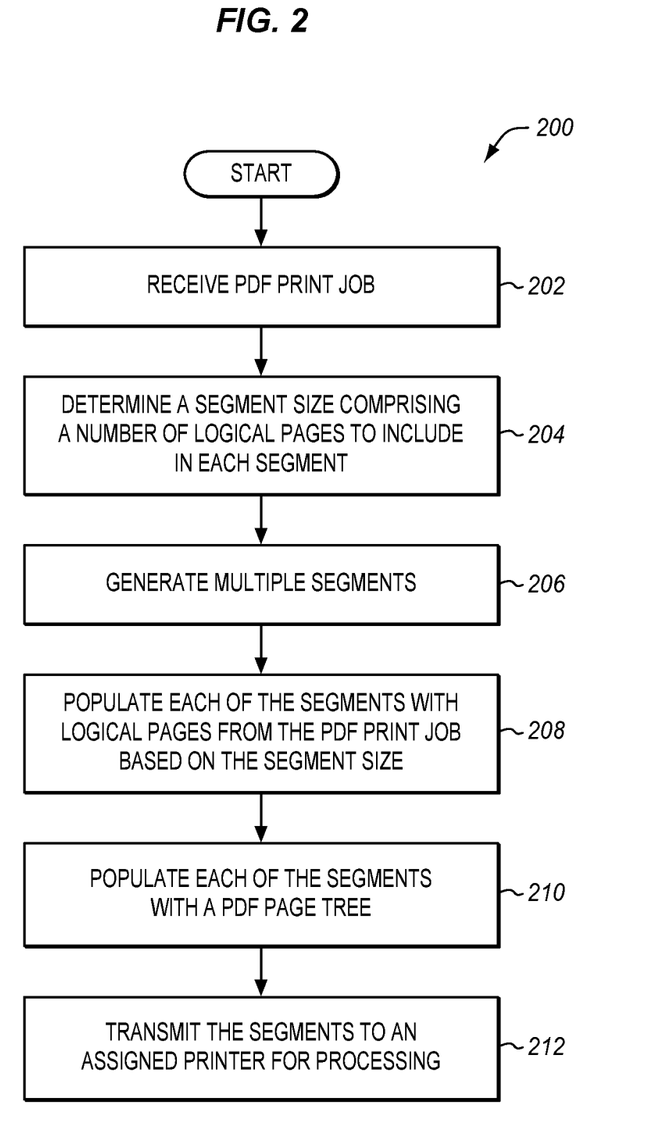
FIG. 2 is a flowchart illustrating a method for dynamically splitting a PDF print job into independent PDF segments in an exemplary embodiment.

FIG. 2 is a flowchart illustrating a method 200 for dynamically splitting a PDF print job into independent PDF segments in an exemplary embodiment. The steps of method 200 are described with reference to printing system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, print server 120 receives a PDF print job from a client 110 via I/F 122. Job controller 124 determines an average memory footprint of the logical pages of the print job (e.g., a size per logical page in memory or an expected size of each logical page after rasterization). This may be accomplished by determining the mean, median, or mode page size for the logical pages of the print job. Job controller 124 may also identify other properties of the print job. Properties of a job are information that can be determined via analysis of the job or its corresponding job ticket. Thus, properties of the print job may indicate the total size of the print job, an expected average rasterization time per logical page, a number of images per page, whether a page needs color printing, etc.

In step 204, job controller 124 determines a segment size for the print job. The segment size indicates a number of logical pages to include in each segment transmitted for printing. In one embodiment, job controller 124 uses different segment sizes for different ranges of memory footprints. For example, a range of zero to one megabyte per logical page may be associated with a size of one thousand logical pages per segment, while a range of one to ten megabytes per logical page may be associated with a size of one hundred logical pages per segment.

In a further embodiment, job controller 124 may assign the print job to a category based on the properties of the print job. Thus, a print job that has a larger than expected number of images per page may be assigned to an "image heavy" category, while a print job that includes no images at all may be assigned to a "text only" category. Job controller 124 may further assign the print job to a printer for printing. Assigning the print job to a printer may involve job controller 124 analyzing memory 126 to identify which of multiple printers has the highest expected printing speed (or the lowest number of expected errors) for a category. Assigning the print job may further comprise analyzing printing queues and/or error states of the printers to determine which printer is expected to print the incoming job fastest and without error. The segment size may be stored in memory 126 on a category-by-category basis, as well as a printer-by-printer basis. Hence, a printer with a slower processing speed may be sent smaller sized segments than a printer with a faster processing speed, even for print jobs that are assigned to the same category.

In step 206, job controller 124 generates multiple PDF segments. In one embodiment, this comprises allocating space to store each PDF segment, and/or setting up an empty PDF file for each segment. In step 208, job controller 124 populates the segments with logical pages from the PDF print job. The number of logical pages included in each segment (except for potentially the last segment) is populated with a number of logical pages based on the segment size. For example, each segment may be populated with a number of logical pages equal to (or as close as possible to) the segment size. Populating a segment with logical pages comprises job controller 124 inserting PDF data for the corresponding logical pages into the segment.

In step 210, job controller 124 populates the segments with a PDF page tree. A PDF page tree is a data structure that includes references to the pages and page objects for the segment. It is constructed using a tree (e.g., a balanced tree) which may improve performance for accessing pages. Since each segment is populated with a PDF page tree and logical pages, each segment described herein operates as an independent PDF file. Thus, each PDF segment may be independently processed by a printer (e.g., printer 130) as a separate job.

In step 212, job controller 124 transmits the segments to printer 130 for processing. Job controller 124 may continue to generate and transmit PDF segments for processing by a printer in steps 206-210 as the print job continues. Furthermore, the processes of generating new segments and transmitting the segments may be performed substantially in parallel in order to reduce and/or eliminate delays between transmitting/processing/printing individual segments.

During this process, printer 130 receives the individual PDF segments/files created by job controller 124. Each time a complete/independent PDF segment is received at printer 130, print controller 134 searches the PDF segment to find and process the PDF page tree therein. Using the information in the PDF page tree, the logical pages defined by the PDF segment may be properly rasterized and printed at printer 130.

Method 200 ensures that segment sizes are capable of being tailored and adjusted on a job-by-job basis. This reduces the chance of slowdowns or errors during printing, which increases overall throughput at a print shop.

In a further embodiment, print server 120 maintains a history of behavioral information for each printer indicating how quickly each segment is printed, whether any errors were encountered in printing any segment, and whether printing halted or slowed down substantially (e.g., by multiple pages per minute) while printing the segment. This information may be compiled based on ongoing communications between the printers and print server 120 during or after printing. This history may be utilized by job controller 124 as feedback to adjust the segment size used by the printer for a category of print job.

Figure 3:
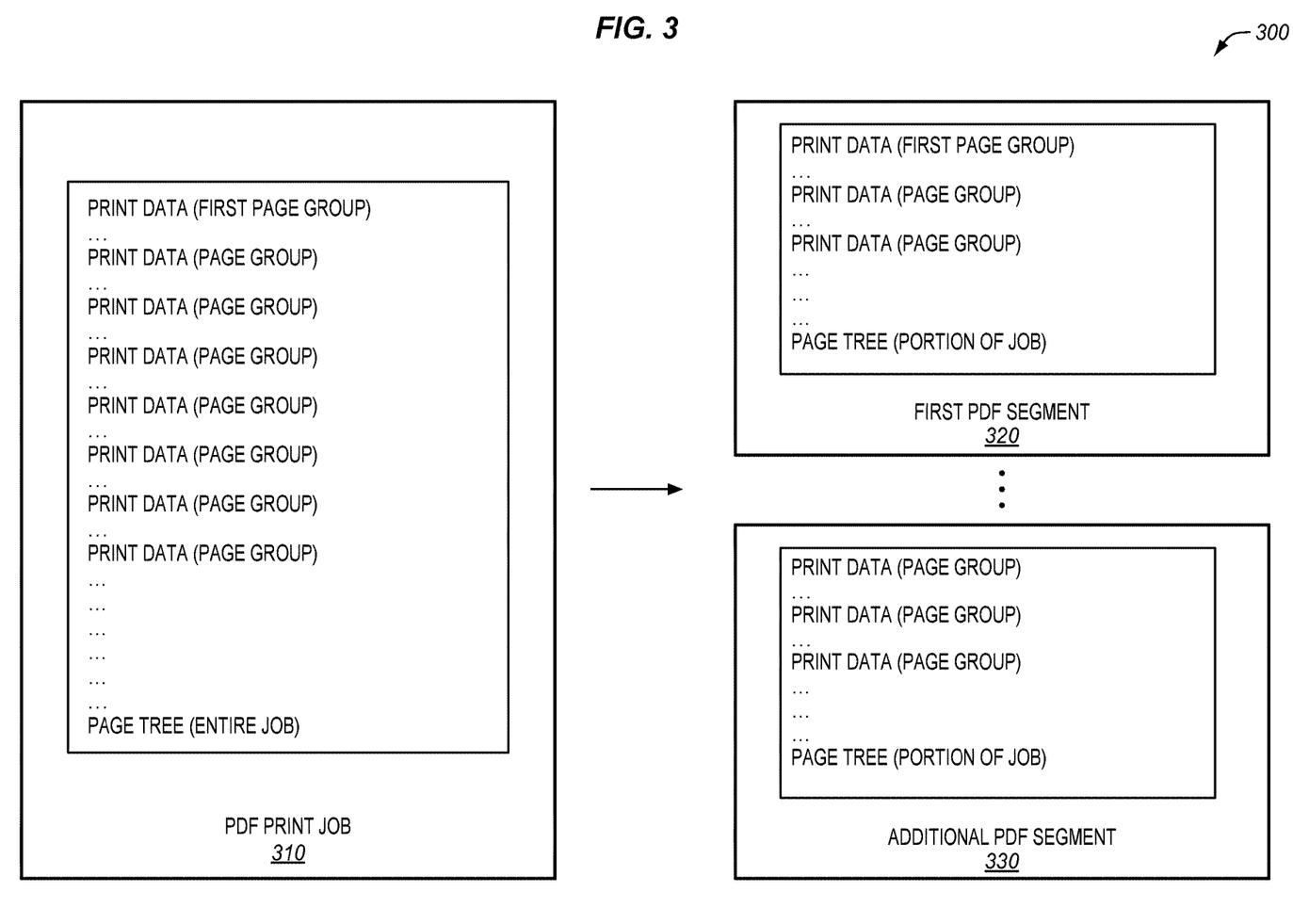
FIG. 3 is a block diagram illustrating a PDF print job that is split into segments in an exemplary embodiment.

FIG. 3 is a block diagram 300 illustrating a PDF print job that is split into independent segments in an exemplary embodiment. FIG. 3 illustrates that a PDF print job 310 includes PDF print data that defines a large number of pages. The pages may be logically divided into page groups via a job ticket or other instructions. As shown in FIG. 3, the print data within the PDF print job may be categorized into page groups based on information in a job ticket (not shown). The location of a page tree is indicated by a PDF trailer (not shown), which itself is placed at the end of PDF print job 310. When job controller 124 splits PDF print job 310 into segments 320 and 330, it generates an individual page tree within each of the PDF segments. Specifically, each PDF segment includes its own page tree describing the pages of that segment.

Figure 4:
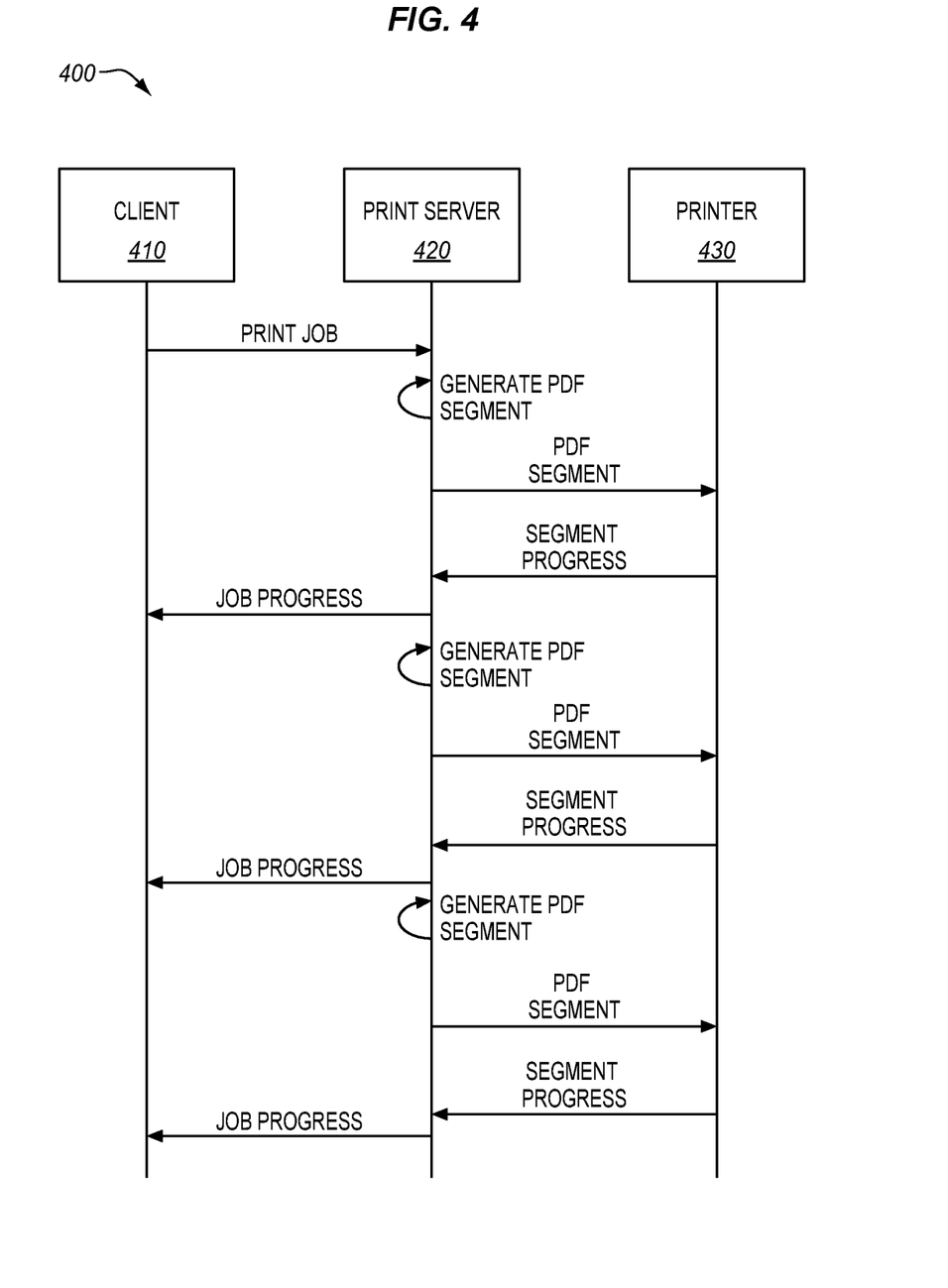
FIG. 4 is a message diagram illustrating communications between elements of a printing system in an exemplary embodiment.

FIG. 4 is a message diagram 400 illustrating communications between elements of a printing system in an exemplary embodiment. According to FIG. 4, a client 410, a print server 420, and a printer 430 cooperate in order to print a large PDF job (e.g., 200,000 pages) that would normally cause substantial printing delays at printer 430. In FIG. 4, client 410 initiates the process by sending the large PDF print job to print server 420. Print server 420 then categorizes the print job, and selects a printer (printer 430) that is considered optimal based on its history with similar print jobs assigned to the category. Print server 420 also analyzes a queue size for the printer to ensure that the printer can start printing the job within a threshold period of time. Job controller 124 then selects a segment size based on the category and the printer. Job controller 124 then iteratively generates and transmits segments to printer 430 for processing. Job controller 124 also updates the history for printer 430 based on any errors and/or slowdowns encountered by printer 430.

Upon completing the print job, print server 420 may analyze the history of printer 430, such as the printing speed of printer 430, any errors that have been encountered, and events that resulted in halting the print job, etc. Based on this history, printer 430 may adjust a segment size for the print job.

Figure 5:
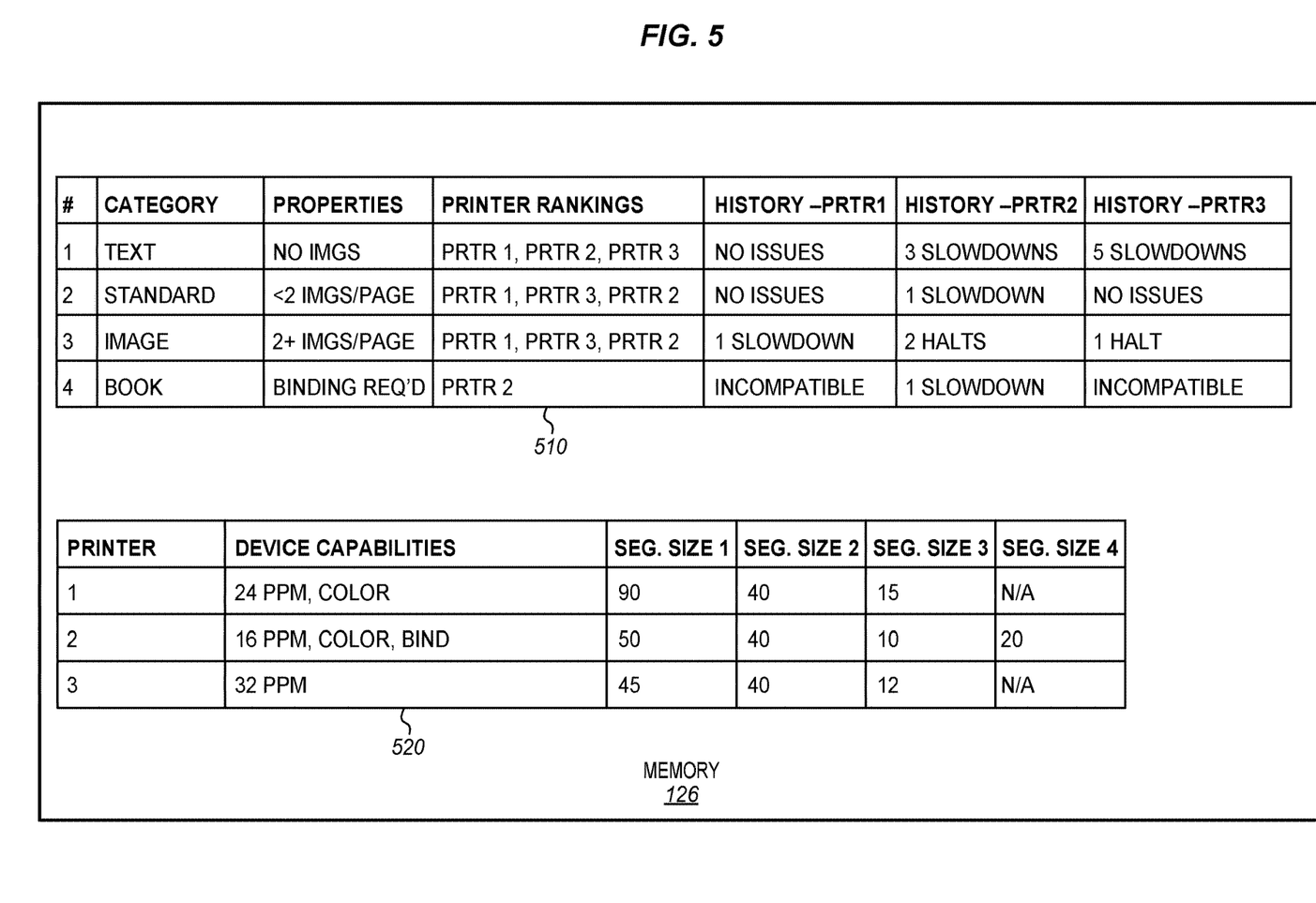
FIG. 5 is a block diagram illustrating data structures for categories of print jobs in an exemplary embodiment.

FIG. 5 illustrates exemplary tables 510 and 520 stored in memory 126 for use by a job controller 124 in an exemplary embodiment. According to FIG. 5, table 510 includes a list of categories that a job may be assigned to. In some embodiments, categories are defined to be mutually exclusive such that each incoming print job is assigned to one and only one category. In other embodiments, such as shown in FIG. 5, a print job may be assigned to multiple categories. Table 510 includes categorization information indicating what properties are required of a print job to be assigned to a category. In this embodiment a "text" category is required to have no images in it, while an "image" category is required to have an average of two or more images per page. Each category is also correlated with printer rankings that indicate the order in which printers are preferred for a given category. Hence, job controller 124 may review a queue for each printer in the rankings, and select the highest ranked printer that is also idle. In a still further embodiment, job controller 124 may assign a print job to multiple categories, and may prioritize assignment of the print job to a printer based on a predefined hierarchy indicating which category should be considered first.

If all printers are currently busy, job controller 124 may further estimate a queue length for each printer and an estimated completion time for the job at each printer based on the category for the print job. Job controller 124 may then assign the print job to the printer having the shortest expected completion time. When calculating expected completion times, job controller 124 may consider a history of each printer with respect to the category of print job. Thus, if a printer is known to regularly encounter slowdowns for print jobs in a given category, this may be factored into the expected printing speed of the printer.

Table 520 includes exemplary printer information maintained by job controller 124. The information stored in table 520 may include device capabilities for the printer, the segment size to use for the printer for different categories, an advertised print speed of the printer, an actual historical print speed of the printer, as measured on a category-by-category basis, and other information. If a printer has no history yet because it is new, job controller may identify another printer of the same model, and copy the history of the other printer to the new printer.

In a further embodiment, job controller 124 is able to identify boundaries between PDF page groups (e.g., mail pieces, billing statements for different customers, etc. as defined in a file/job ticket accompanying the PDF print job) in the original PDF print job. Job controller 124 may split the PDF print job into segments at boundaries between PDF page groups. In this manner, each PDF segment may be generated without revising print data defining the page groups of the original print job.

In a still further embodiment, the job controller is able to identify finishing instructions for the PDF print job, and to split the PDF print job into segments at boundaries between finishing instructions (e.g., stapling, binding, hole punching, etc.). This ensures that pages which are stapled and/or bound together are included in the same PDF segment, ensuring that printer 130 may properly handle each PDF segment as an independent print job.

In a further embodiment, job controller 124 analyzes behavioral information provided by each printer in response to printing different categories of print jobs. Job controller tracks, on a printer by printer basis, the average speed of the printer while printing different categories of jobs, the number of errors encountered by the printer while printing different categories of jobs, any slowdowns or halting of printing while printing different categories of jobs, etc. Based on this information, job controller 124 is capable of determining whether or not the reported speed of a printer is accurate for a given category of job. For example, if a printer has a firmware error that causes it to halt printing every time it attempts to rasterize a specific type of image format, the printer may be a poor fit for categories of print jobs that utilize that image format. Job controller 124 may detect this condition by determining that the printer has halted a larger number of times than other printers while printing jobs of the category. Job controller 124 may therefore rank the printers based on their prior performance (and/or queue size) in order to select the appropriate printer for the job.

In yet a further embodiment, job controller 124 dynamically adjusts the segment size for a printer in a given category, based on the behavioral history reported by the printer. For example, if the printer has continually reported no errors or drops in speed for handling a given segment size, job controller 124 may increase the segment size in order to reduce its own processing burden without impeding overall printing speed. Alternatively, if the printer is encountering numerous slow-downs while handling PDFs of the current segment size, job controller 124 may temporarily reduce segment size, confirm that the new segment size has caused a performance improvement (e.g., an increase in printing speed or reduction in printing errors), and then permanently implement this change in segment size. These changes to segment size for a category may be performed on a printer by printer basis.

Figure 6:
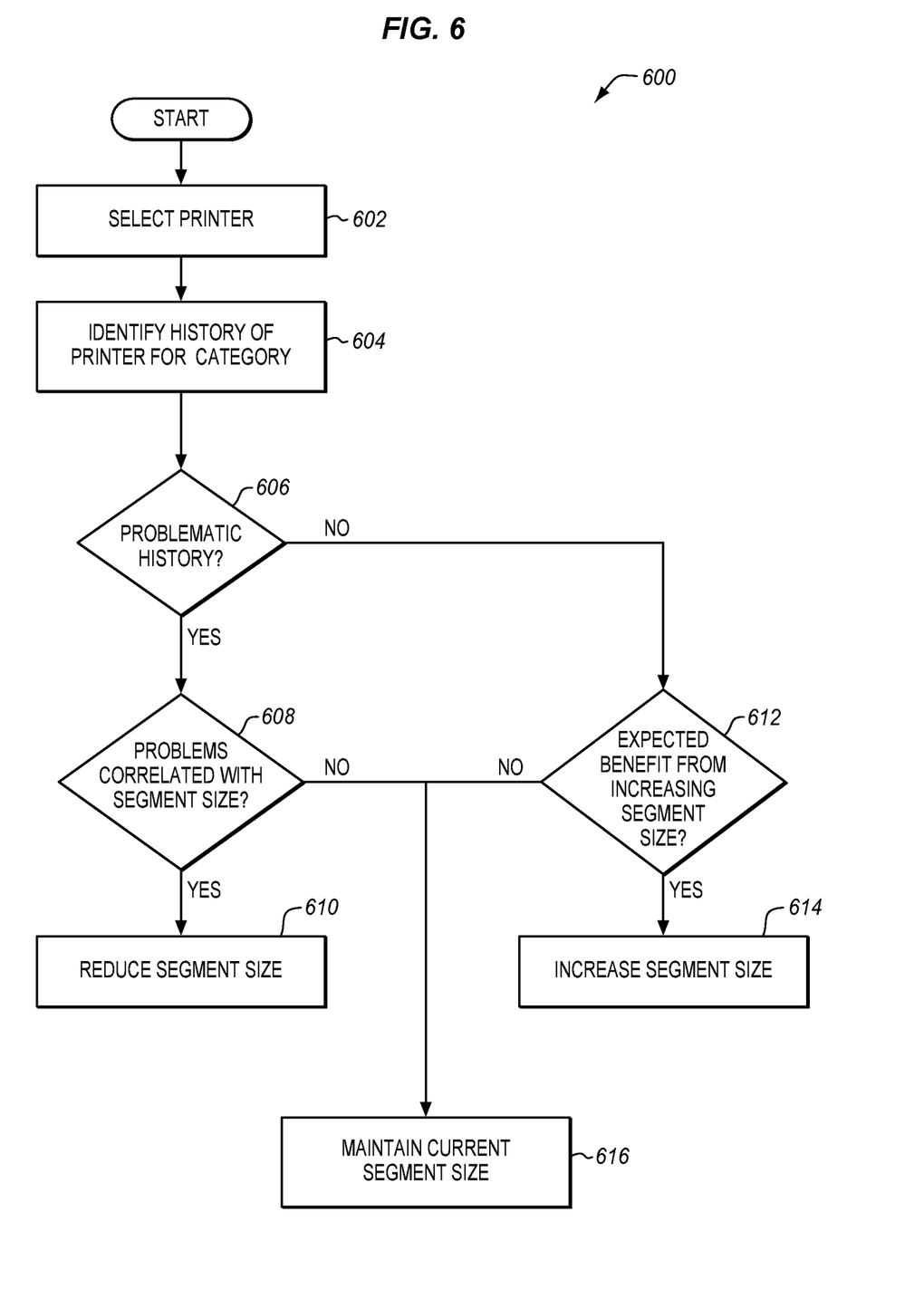
FIG. 6 is a flowchart illustrating a method for adjusting PDF segment sizes for a printer in an exemplary embodiment.

FIG. 6 illustrates an exemplary method 600 for dynamically altering a segment size for a printer based on the behavioral history of that printer. In method 600, job controller 124 selects a printer for an incoming print job, based on the category for that print job in step 602. This may include filtering printers that do not have device capabilities required by the print jobs, and then selecting a remaining printer having the highest priority for that category. In step 604 job controller 124 identifies a behavioral history of the printer for the category. The behavioral history may be stored in memory at job controller 124, based on progress reports and/or error conditions reported to job controller 124 by the printer.

In step 606, job controller 124 determines whether or not the behavioral history is problematic. This is indicated by the number and severity of prior error conditions, slowdowns, or halts for print jobs in the category. If the behavioral history of the printer is problematic (e.g., based on the number of slowdowns or errors), then processing continues to step 608, wherein job controller 124 determines whether or not the problems indicated in the history are related to segment size. For example, if the printer encountered a halt condition while printing a print job in the category, but the halt was caused by a print shop operator inspecting a roller of the printer, then the halt was not caused by segmenting issues and therefore should be ignored. Alternatively, if the printer halted because of rasterization and/or processing delays, then segment size could be the cause of these delays. This is because most printers must process an entire PDF segment before they can initiate printing. Thus, large PDF segments may potentially cause processing delays. If the problem is correlated with segment size, then job controller 124 reduces the segment size in step 610. Alternatively, if the problem is not correlated with segment size, then job controller 124 maintains the current segment size in step 616.

If in step 606 there was no problematic behavioral history for the printer with respect to the current category, then in step 612 job controller 124 determines whether or not there is an expected benefit from increasing segment size. The expected benefit may comprise a decrease in processing load at job controller 124, or an expected increase in printing speed (e.g., to an optimal printing speed) at the printer. If there is an expected benefit in step 612, then job controller 124 increases the segment size in step 614. Alternatively, if there is no expected benefit in step 612, then the current segment size is maintained at step 616.

In yet another embodiment, job controller 124 is adapted to selectively omit data from a segment if the data has already been received by the printer during the processing of the PDF print job. For example, if a printer has already received information defining an image while printing the job, and the image is repeated in the segment, job controller 124 may omit the definition of that image from the segment.

EXAMPLES

In the following examples, additional processes, systems, and methods are described in the context of a print server that categorizes a large PDF print job and splits the large PDF print job into independent PDF segments for processing by a printer.

According to this example, a user submits a 200,000 page PDF print job to a print server. The PDF print job is accompanied by a Job Definition Format (JDF) job ticket that includes finishing instructions (in this case, stapling instructions) for the pages of the PDF print job. A job controller at the print server analyzes the PDF print data and the JDF job ticket to determine an average memory footprint of the job per logical page. Because the average footprint per logical page is greater than five Megabytes (MB), the print job is categorized as a processing-intensive print job. The job controller also identifies required device capabilities indicated by the print data and the JDF job ticket. The required device capabilities include color printing and binding. The job controller therefore disqualifies printers that are incapable of binding and color printing, and then analyzes the remaining printers to determine which printer is the most highly ranked for the category of processing-intensive jobs. In this example, the most highly ranked printer comprises a continuous-forms printer capable of printing jobs of this category at four hundred pages per minute.

Once the printer has been selected, the job controller accesses an internal memory to determine a segment size for the category of processing-intensive jobs. The segment size is two thousand pages for this category. The job controller then reviews behavioral history for the printer. The behavioral history includes a series of printing progress reports from the printer for the processing-intensive job category. The job controller analyzes the history and determines that the printer has halted printing multiple times while printing jobs of this category. The job controller determines that, because the halts in printing were due to processing delays related to interpretation and rasterization at the printer, the segment size should be reduced by ten percent to one thousand and eight hundred pages. The job controller then starts segmenting the print job and transmitting segments to the printer for printing.

When assembling a PDF segment from the original PDF print job, the job controller adds consecutive PDF page groups to the segment until the segment gets close to the size limit. In this embodiment, the boundaries of each page group are determined based on information in the JDF job ticket. Specifically, the JDF job ticket includes information defining page exceptions (e.g., groups of pages designated for special treatment during or after printing), such as media groups/page groups or finishing instructions (e.g., staple groups). During segmentation, the job controller ensures that splitting does not occur within a group. This type of analysis may consider the boundaries for many different types of groups (e.g., media groups, staple groups, etc.). This is significant because splitting a PDF job across a staple group would cause the output from the printer to be incorrect. The job controller, in addition to considering page group boundaries/finishing instruction boundaries defined in the JDF job ticket, also tracks the size of the PDF segment it is generating. If adding another page group would cause the segment to exceed the size limit, then the segment is completed by generating and appending a PDF page tree for the segment. The segment is then transmitted to the printer and the job controller starts to assemble a new segment.

In addition to splitting the original PDF print job into independent PDF segments, the job controller splits the original JDF job ticket into independent JDF job ticket segments. Each JDF job ticket segment is a complete JDF file that corresponds with a different PDF segment, and is transmitted to the printer along with its corresponding PDF segment. Since each JDF job ticket segment corresponds with a different PDF segment, and since each PDF segment does not split a page group/finishing instruction, the JDF job ticket segments also do not split individual page groups/ finishing instructions This ensures that the printer is capable of independently handling finishing instructions for each PDF segment without requesting further information from the print server.

Figure 7:
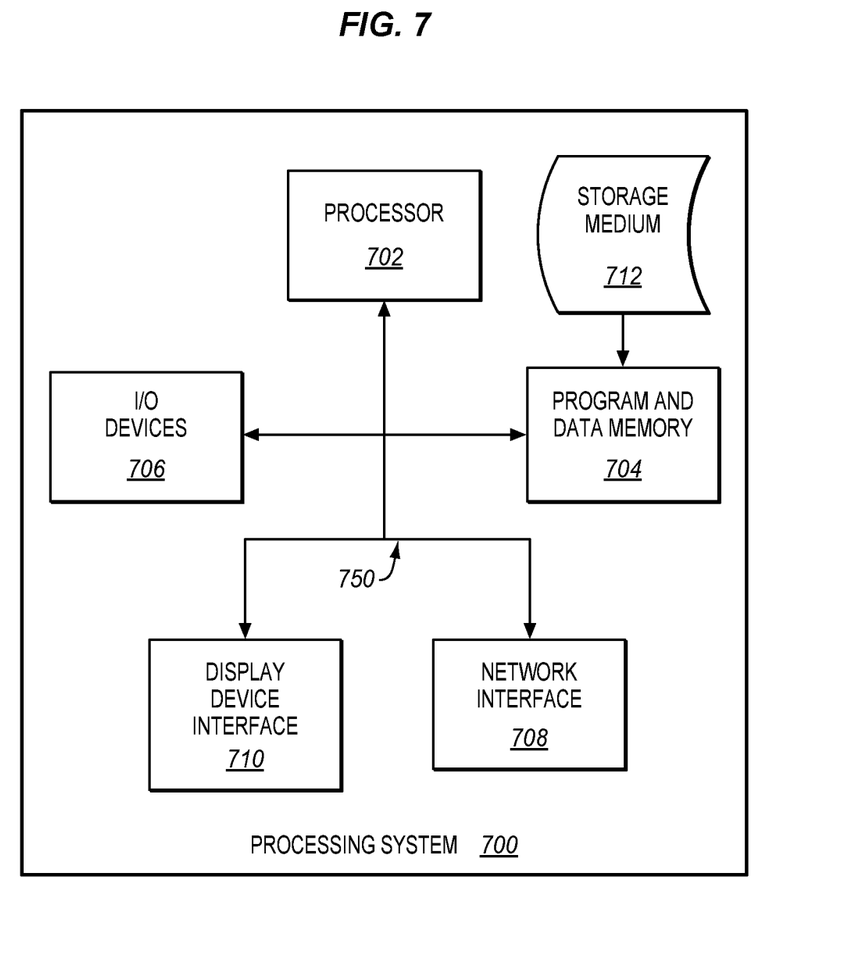
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print server 120 to perform the various operations disclosed herein. FIG. 7 illustrates a processing system 700 operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

We Claim:

1. A system comprising:
a print server comprising:
an interface configured to receive a Portable Document Format (PDF) print job comprising logical pages; and
a job controller configured to divide the PDF print job into segments by:
determining a memory footprint indicative of an expected size of each of the logical pages, based on a determined size of at least two of the logical pages;
determining a segment size comprising a number of the logical pages to include in each segment based on the memory footprint for the logical pages, generating multiple segments, populating each of the segments with logical pages from the PDF print job based on the segment size, and populating each of the segments with a PDF page tree;
wherein the job controller is configured to transmit the segments to an assigned printer for processing;
wherein the job controller mathematically calculates the memory footprint as a mean, median, or mode.

2. The system of claim 1 wherein:
the job controller is configured to select the assigned printer from multiple available printers, and
the job controller is configured to determine the segment size based on a combination of the memory footprint and an identity of the assigned printer.

3. The system of claim 1 wherein:
the job controller is configured to assign the print job to one of multiple categories based on the memory footprint, and each category is associated with a different segment size, and the categories are selected from image, text, standard, and book.

4. The system of claim 3 wherein:
the job controller is configured to identify a history indicating how a prior PDF print job of the same category was processed by the printer, and to revise the segment size based on the history.

5. The system of claim 4 wherein:
the job controller is configured to reduce the segment size in response to determining that the printer printed more slowly than an expected speed for the segment size.

6. The system of claim 4 wherein:
the job controller is configured to increase the segment size in response to determining that the printer has printed faster than an expected speed for the segment size.

7. A method comprising:
receiving a Portable Document Format (PDF) print job;
dividing the PDF print job into segments by:
determining a memory footprint indicative of an expected size of each of the logical pages, based on a determined size of at least two of the logical pages;
determining a segment size comprising a number of the logical pages to include in each segment, based on the memory footprint for the logical pages;
generating multiple segments;
populating each of the segments with logical pages from the PDF print job based on the segment size;
populating each of the segments with a PDF page tree;
and transmitting the segments to an assigned printer for processing; and
wherein the memory footprint is mathematically calculated as a mean, median, or mode.

8. The method of claim 7 further comprising:
selecting the assigned printer from multiple available printers,
wherein determining the segment size is based on a combination of the average memory footprint and an identity of the assigned printer.

9. The method of claim 7 further comprising:
assigning the print job to one of multiple categories based on the memory footprint, each category being associated with a different segment size, and the categories are selected from image, text, standard, and book.

10. The method of claim 9 further comprising:
identifying a history indicating how a prior PDF print job of the same category was processed by the printer; and
revising the segment size based on the history.

11. The method of claim 10 further comprising:
reducing the segment size in response to determining that the printer printed more slowly than an expected speed for the segment size.

12. The method of claim 10 further comprising:
increasing the segment size in response to determining that the printer has printed faster than an expected speed for the segment size.

13. A non-transitory computer readable medium embodying programmed instructions which, when executed by a processor, are operable for performing a method comprising:
receiving a Portable Document Format (PDF) print job;
dividing the PDF print job into segments by:
determining a memory footprint indicative of an expected size of each of the logical pages, based on a determined size of at least two of the logical pages;
determining a segment size comprising a number of the logical pages to include in each segment, based on the memory footprint for the logical pages;
generating multiple segments;
populating each of the segments with logical pages from the PDF print job based on the segment size;
populating each of the segments with a PDF page tree; and transmitting the segments to an assigned printer for processing; and
wherein the memory footprint is mathematically calculated as a mean, median, or mode.

14. The medium of claim 13, wherein the method further comprises:
selecting the assigned printer from multiple available printers,
wherein determining the segment size is based on a combination of the memory footprint and an identity of the assigned printer.

15. The medium of claim 13, wherein the method further comprises:
assigning the print job to one of multiple categories based on the memory footprint, each category being associated with a different segment size, and the categories are selected from image, text, standard, and book.

16. The medium of claim 15, wherein the method further comprises:
identifying a history indicating how a prior PDF print job of the same category was processed by the printer; and
revising the segment size based on the history.

17. The medium of claim 13 wherein the method further comprises:
reducing the segment size in response to determining that the printer printed more slowly than an expected speed for the segment size.

18. The medium of claim 13 wherein the method further comprises:
increasing the segment size in response to determining that the printer has printed faster than an expected speed for the segment size.

* * * * *